United States Patent [19]

Salerno

[11] 4,323,036

[45] Apr. 6, 1982

[54] AUTOMATIC WATERING APPARATUS

[76] Inventor: Michael Salerno, 665 Blossom St., Fitchburg, Mass. 01420

[21] Appl. No.: 142,734

[22] Filed: Apr. 22, 1980

[51] Int. Cl.³ .................. A01K 39/02; A01K 7/02
[52] U.S. Cl. ............................................. 119/81
[58] Field of Search .................. 119/81, 78, 79, 80; 137/408

[56] References Cited

U.S. PATENT DOCUMENTS

| | | | |
|---|---|---|---|
| 2,632,463 | 3/1953 | Martin | 119/81 X |
| 3,063,417 | 11/1962 | Blosser | 119/79 |
| 4,164,201 | 8/1979 | Vanderhye | 119/81 |
| 4,192,257 | 3/1980 | Urzi | 119/81 |

Primary Examiner—Hugh R. Chamblee

[57] ABSTRACT

An automatic watering apparatus for poultry and the like, the apparatus comprising a central post, a sleeve reciprocally but non-rotatably mounted on the post, a valve assembly mounted on the post, a supply tube extending from the valve assembly and in communication with a water source, the sleeve and the valve assembly being engageable to operate the valve assembly, and a bell member rotatably fixed to the sleeve and having a channel for collection of water discharged from the valve assembly.

10 Claims, 5 Drawing Figures 4,323,036

AUTOMATIC WATERING APPARATUS

BACKGROUND OF THE INVENTION

1. Field of the Invention

The invention relates to automatic watering devices, and more particularly to an automatic watering apparatus for poultry and the like.

2. Description of the Prior Art

Automatic watering devices, for poultry and the like, are generally known in the art. In U.S. Pat. No. 3,283,746, issued Nov. 8, 1966 to H. Ruter, there is disclosed an automatic poultry watering device including a freely suspended bell-shaped drinking vessel having an annular channel at its lower end for the collection of drinking water. The bell is free to move reciprocally, responsive to a spring bias and the weight of the water contained in the channel. Such movement of the drinking vessel operates a valve assembly to automatically start and stop flow of drinking water to the drinking channel.

In like manner, U.S. Pat. No. 3,590,782, issued July 6, 1971 and U.S. Pat. No. 3,685,494, issued Aug. 22, 1972, both to I. Kantor, show a suspension-type poultry drinking fountain including a bell-shaped member having a water channel, or trough, a valve, a hanger supporting the bell member in freely swinging suspension, and a resilient mounting suspending the trough from the hanger, such that when water in the trough drops to a predetermined quantity the trough rises and opens the valve to permit more water to flow to the trough.

U.S. Pat. No. 4,164,201, issued Aug. 14, 1979 to R. A. Vanderhye shows a similar device, but having a ground support facility rather than a suspension-type mounting.

In the aforementioned prior art devices, the bell-shaped drinking vessels, though movable reciprocally, are not adapted to turn on their mountings. In the suspension-type device, the shoving and pushing of poultry causes the entire apparatus to turn on its axis. Inasmuch as the valve assembly of the suspension-type device is connected to a reservoir of drinking water by flexible supply tubing, turning of the entire apparatus causes twisting of the hangers and the supply tubing with consequent interruption of flow of drinking water.

In both the ground support and suspension-type of prior art device, the flow from the valve assembly to the drinking vessel channel is directed along a particular path on the surface of the bell-shaped vessel, with consequent erosive effects along that particular path and build-up of dust and possible contamination on the vessel surface elsewhere.

Another shortcoming of devices of the prior art lies in the fact that drinking channels, or troughs, suitable for grown poultry are dangerous for baby chicks which push and shove each other to an extent causing some of the chicks to fall into the trough and drown.

SUMMARY OF THE INVENTION

An object of the present invention is to provide an automatic watering apparatus adapted for use in a ground support mode and as a suspension-type device.

A further object of the invention is to provide such an apparatus in which the drinking vessel is mounted for relative rotation to obviate entanglement of the supply tubing and hanger means, and further to provide a flow path over substantially the entire exterior of the bell-shaped drinking vessel to maintain cleanliness of the surface of the vessel.

A still further object of the invention is to provide a removable shield device which may be disposed in the trough of the drinking vessel to minimize drownings of baby chicks.

With the above and other objects in view, as will hereinafter appear, a feature of the present invention is the provision of an automatic watering apparatus comprising a central post, a sleeve reciprocally but non-rotatably mounted on the post, a valve assembly mounted on the post, a supply tube extending from the valve assembly and in communication with a water source, the sleeve and the valve assembly being engageable to operate the valve assembly, and a bell member rotatably fixed to the sleeve and having a channel for collection of water discharged from the valve assembly.

In accordance with a further feature of the invention there is provided in the water collecting channel a removable annular shield which decreases the exposed width of the channel to prevent baby chicks from falling into the channel.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings:

FIG. 5 is a cross-sectional view taken substantially along line 5—5 of FIG. 1.

DESCRIPTION OF THE PREFERRED EMBODIMENT

Figure 1:
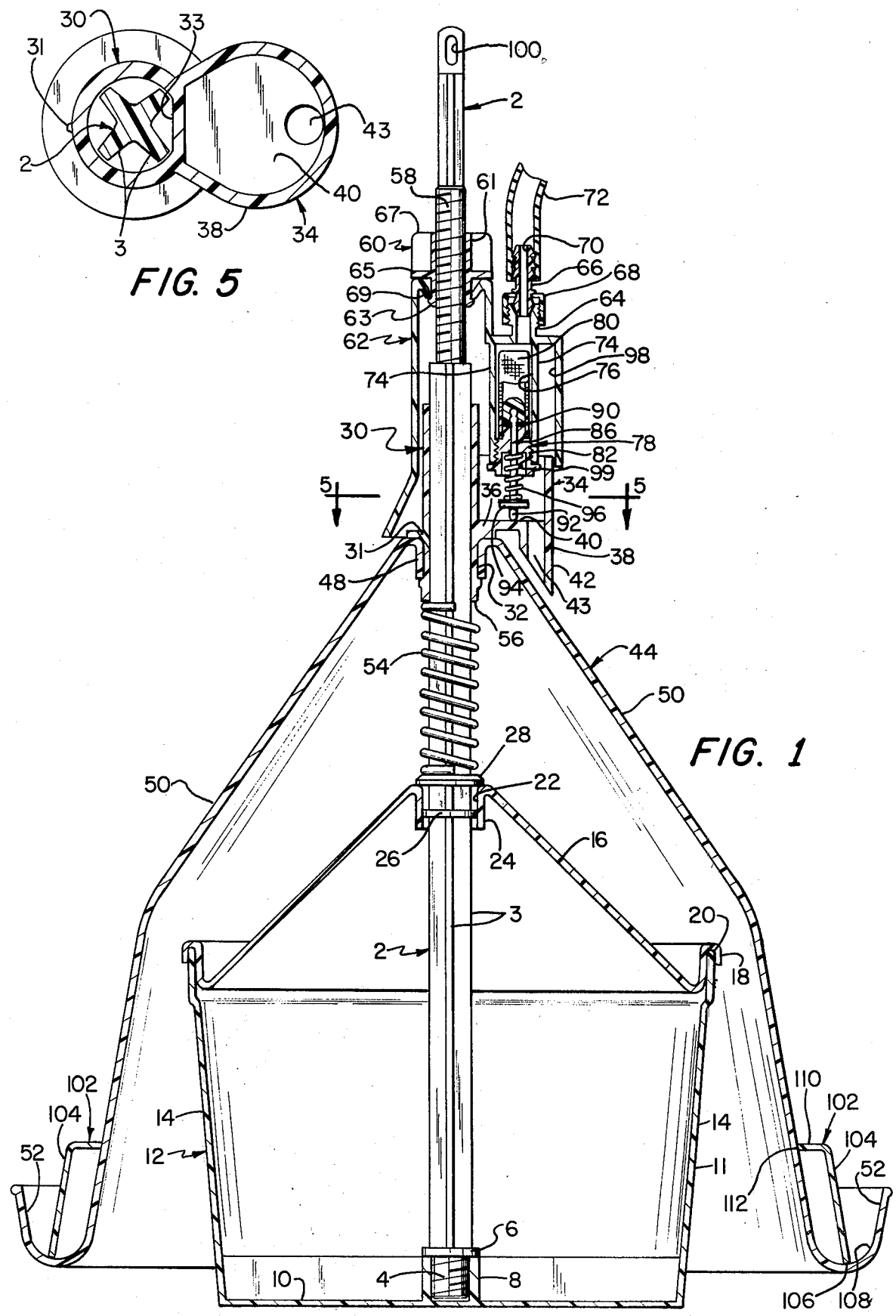
FIG. 1 is a sectional view in side elevation of the apparatus.
Figure 2:
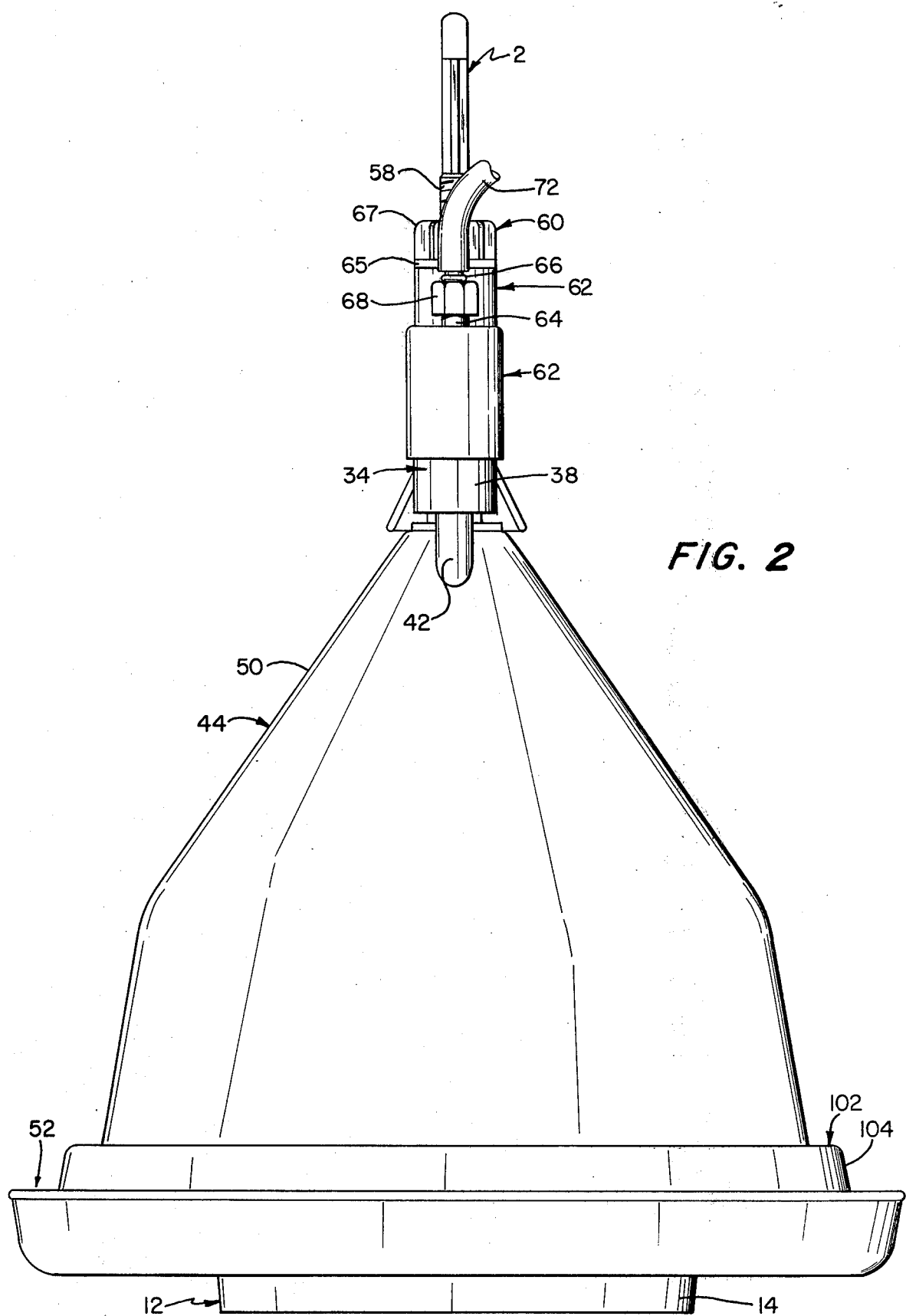
FIG. 2 is a side elevational view thereof.

Referring to the drawings, it will be seen that the invention includes a central post 2 characterized by radially projecting ribs 3. The bottom end of the post 2 has a first round threaded portion 4 (FIG. 1) and a stop member in the form of a circular flange 6. The threaded portion 4 is threadedly received by a cylindrical portion 8 upstanding from a bottom wall 10 of a vessel 11 which forms part of a container 12. The vessel 11 has an annularly curved sidewall 14 upstanding from the periphery of the bottom wall 10. The container 12 also includes a lid member 16 disposed on the vessel 11, the lid member having about its periphery a lip portion 18 which fits upon a free top edge 20 of the sidewall 14. Disposed centrally of the lid member 16 is an opening 22 defined by a sleeve portion 24 of the lid member. A circular flange 26 on the post 2 engages the interior of the sleeve portion 24. Another larger annular flange 28 on the post 2 bears against the upper side of the lid member 16 proximate the opening 22.

In assembly, the lid member 16 is slid onto the post 2, the threaded portion 4 of which is then threaded into the cylindrical portion 8 of the vessel 11. As the threaded portion 4 enters the cylindrical portion 8, the flange member 28 forces the lid member 16 into firm engagement with the vessel sidewall 14. Upon engagement of the stop member 6 with the cylindrical portion 8, the assembly of the container 12 is completed, the container 12 being attached to and supported by the post 2 at two parts. Before assembly, the container 12 is partially filled with a ballast material, such as water, or a granular substance, for purposes described below.

Slidably disposed on the post 2 is a sleeve member 30 having at its lower end an external cylindrical groove 32 terminating in flat upper and lower circular surfaces. The sleeve 30 has a cross-section characterized by a flat surface 33 (FIG. 5) that interacts with two of the ribs 3 to prevent rotation of the sleeve on the post 2, while allowing the sleeve to slide lengthwise on the post 2. Extending from the sleeve member 30 is a cup portion 34 defined by a bottom wall 36 and an upstanding sidewall 38. The bottom wall 36 has an upper surface 40 which, as will be described in detail below, serves as a cam surface. A spout portion 42 defining a water discharge passageway 43 extends downwardly from the bottom wall 36 of the cup portion 34. Preferably, but not necessarily, a hole 31 is provided in the sleeve 30 to permit injection of a suitable lubricant to facilitate sliding.

A bell member 44 has a central opening 46, formed by an annular lip 48, and extending from the lip 48 a downwardly and outwardly projecting bell skirt 50. At its periphery, the bell skirt 50 is formed to provide an annular bell channel 52. The annular lip 48 is rotatably mounted in the groove 32, so that the bell member 44 may turn relative to the sleeve 30.

A coil spring 54 is disposed about the post 2 between the flange member 28 and a lower edge 56 of the sleeve member 30. The spring 54 urges the sleeve member 30, and thereby the bell member 44, upwardly on the post 2.

The central post 2 includes a second threaded portion 58 on which is threadedly disposed a nut 60 which may be manually rotated on the post and thereby caused to ride upwardly or downwardly on the threaded portion 58. The nut 60 includes a cylindrically-shaped core portion 61 having at its lower end an annular lip 63. Extending outwardly from the core portion 61 is a flange portion 65 and extending from the flange portion 65 and the core portion 61 are grip members 67 by which the nut 60 may be manually grasped and rotated on the post 2.

Attached to the nut 60 is a housing 62 which includes an inturned collar portion 69 which abuts the underside of the nut flange portion 65 and has a free edge disposed on the nut annular lip 63. The nut 60 is free to rotate in the collar portion 69 of the housing 62. The housing 62 further includes a threaded inlet nozzle 64 in which is disposed a connector 66 (FIG. 1). The connector 66 and the nozzle 64 are coupled by a threaded collar 68 which rotatably surrounds the connector and is threaded upon the nozzle 64. The connector 66 has a central bore 70 in communication with the interior of the inlet nozzle 64. A water supply tube 72, usually flexible, is fixed to the connector 66 to place a reservoir of water (not shown) in communication with the inlet nozzle 64.

Figure 3:
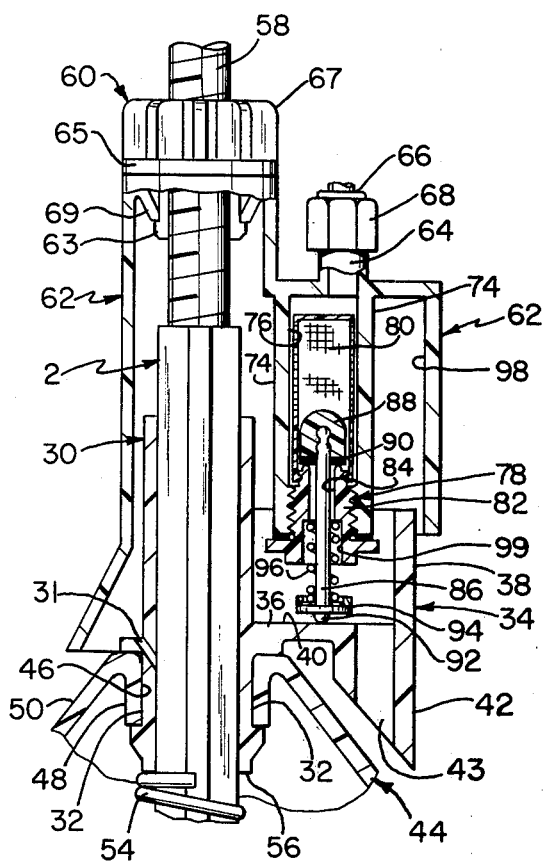
FIG. 3 is an enlarged detailed view of a portion thereof.
Figure 4:
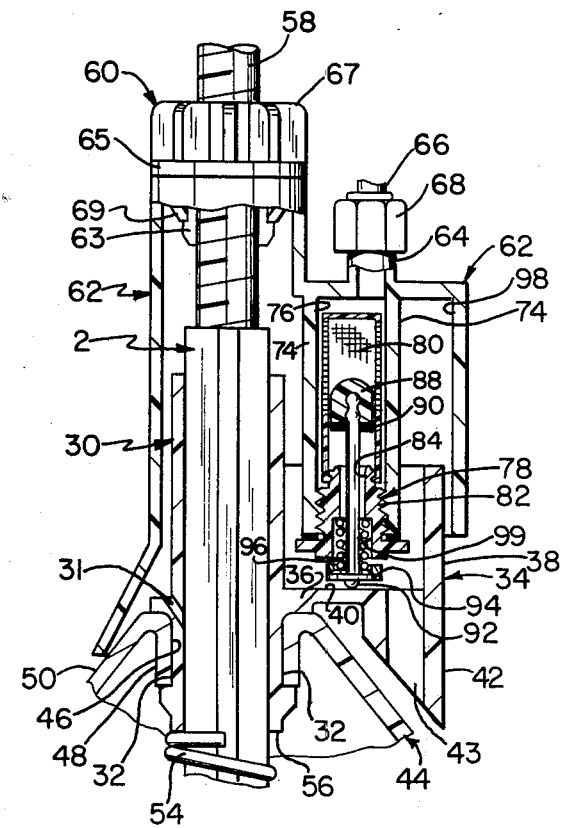
FIG. 4 is similar to FIG. 3, but showing operative parts in different positions.

The housing 62 is provided with wall portions 74 defining a chamber 76 in which is disposed a valve assembly 78 covered by a filter 80. The valve assembly 78 includes a body portion 82 which is screwed into the chamber 76. The body portion 82 has a channel 84 (FIGS. 3 and 4) therethrough. Disposed in the channel 84 is a valve stem member 86 having at its upper end a plunger or valve head 88 with a sealing ring 90 suitable for sealing off the channel 84. At its lower end, the stem member 86 is provided with a cam section 92 and a flange 94. Disposed about the stem member 86 is a coil spring 96 which at one end is received in a pocket 98 on the underside of the valve body portion 82, and at the other end abuts the flange 94. The coil spring 96 thus urges the sealing ring 90 into a position (FIGS. 1 and 3) in which the sealing ring 90 closes off channel 84. The cam section 92 is engageable with the cam surface 40 to operate the valve and force the stem member to an open position, as will be further described below.

The housing 62 includes a slideway 98 which receives the sidewall portions 38 of the cup portion 34. The sleeve member 30, and the cup portion 34, are accordingly adapted to move into and out of the housing 62.

In operation, the container 12 may be placed upon the ground, a floor, or a stand (not shown), or the device may be suspended from an overhead hanger. In the latter case, the post 2 is made long enough so that the bottom portion of the container 12 projects below the bottom end of the bell member 44. In the ground supported mode, the ballast placed in the container 12, provides for a stable and secure base for the apparatus. The central post 2 may be suspended by a suitable suspension or hanger means connected to an opening 100 in the upper end of the post. In the suspended mode, the ballast in the container 12 provides for stability of the apparatus. The coil spring 54, resting on the flange member 28, exerts an upward bias on the sleeve member 30. As the sleeve member 30 rides upwardly on the post 2, the cam surface 40 engages the cam section 92. Continued upward movement of the cam surface 40 causes upward movement of the stem member 86, against the bias of the coil spring 96. Upward movement of the stem member 86 causes the sealing ring 90 to disengage from the channel 84, thereby to permit flow of water from the supply tube 72, through the connector 66, the nozzle 64, through the filter 80 and the channel 84 into the cup portion 34 and thence through the spout 42 onto the exterior of the bell member skirt 50. The water flowing down the sides of the skirt 50 collects in the bell channel 52, where it is available for drinking by chickens, and the like.

As water collects in the bell channel 52, and if more water enters the channel than is used, the bell member 44 grows progressively heavier. The increased weight of the bell member pulls the sleeve member 30 downwardly, against the bias of the coil spring 54. Continued downward movement of the sleeve member 30 allows the stem member 86, and thereby the sealing ring 90, to respond to the downward bias of the coil spring 96 and approach a closed position in the valve assembly 78. If water continues to accumulate in the bell channel 52, the cam surface 40 will continue downward movement, permitting the coil spring 96 to pull the sealing ring 90 into a closed position, stopping the flow of water into the channel 52.

Thus, the engagement of the bottom wall 36 of the sleeve member 30 with the valve assembly 78 causes the valve assembly to facilitate flow of water to the bell channel 52. Conversely, disengagement of the wall 36 of the sleeve member 30 from the valve assembly allows the spring 76 to cause the valve assembly 78 to effect stopping of the flow of water to the bell channel. If it is desired to alter the interrelationship of the valve assembly and the sleeve member and thereby the timing of the operation of the valve assembly, such may be accomplished by manual rotation of the nut 60, causing the nut to move upwardly or downwardly on the post 2. Axial movement of the nut 60 causes corresponding axial movement of the housing 62, and thereby the valve assembly 78. Rotational movement of the nut 60 is not transmitted to the housing 62, the core portion 61 of the nut 60 rotating in the collar portion 69 of the housing 62.

In the bumping and shoving of a multiplicity of chickens, or the like, against the bell member 44, when the apparatus is suspended by a hanger attached to the post 2 at the opening 100, the bell member will be inclined to turn. Inasmuch as the bell member is freely rotatable on the sleeve member 30, the bell member is free to turn relative to the post 2, leaving the remainder of the apparatus, and particularly the sleeve member 30, the housing 62 and the tube 72, stationary. Thus, the otherwise probable entanglement of the tube 72 and post 2 is entirely avoided. In addition, the free rotation of the bell member permits the flow of water from the spout portion 42 to flow down the entire surface of the skirt 50, rather than in one portion thereof only, enhancing the cleanliness of the bell member and avoiding a concentrated erosive flow path.

It has been found that in the watering of baby chicks, drownings may occur as a consequence of chicks falling into the bell channel 52. To prevent such happenings, there may be provided an annular shield member 102 which fits within the bell channel 52, reducing the effective cross-sectional area of the channel, to leave sufficient room for baby chicks to drink, but making it difficult for a chick to fall into the channel.

The shield member 102 includes a first wall portion 104 having a free edge 106 (FIG. 1) engageable with a bottom portion 108 of the bell channel 52, and a second wall portion 110 having a free edge 112 engageable with the bell skirt 50, the first and second walls preferably being an integral unit. The shield member 102 decreases the water surface area exposed, greatly reducing the incidence of chick drownings. The shield member is readily removable from the channel 52 to facilitate watering of larger fowl.

It is to be understood that the present invention is by no means limited to the particular construction herein disclosed and/or shown in the drawings, but also comprises any modifications or equivalents within the scope of the disclosure. For example the post 2 is shown in portions in the form of a crossbeam of "X" configuration. It will be apparent that such portions could as well be of cylindrical or tubular configuration.

Further, the flanges 6, 26 and 28 may be made as separate members attached to the post 2 by suitable means. Still other changes will be obvious to persons skilled in the art.

Having thus described my invention what I claim as new and desire to secure by Lettes Patent of the United States is:

1. An automatic watering apparatus comprising a central post, means for supporting said post, a sleeve slidably but non-rotatably mounted on said post, a valve assembly, means for mounting said valve assembly on said post, a supply tube for connecting said valve assembly to a water source, said sleeve and said valve assembly being engageable to operate said valve assembly, a bell member rotatably mounted on said sleeve and having a channel for collection of water discharged from said valve assembly, and means for biasing said sleeve and bell member in a direction whereby said valve assembly is operated by said sleeve.

2. The invention in accordance with claim 1 in which said valve assembly is disposed in a housing mounted on said post, said housing being adapted to be selectively positioned on said post lengthwise of said post.

3. The invention in accordance with claim 2 in which said means for supporting said post comprises a vessel attached to one end of said post and surrounded by said bell member, a cover for said vessel, and means connected to said post for maintaining said cover in tight engagement with said vessel.

4. The invention in accordance with claim 2 in which said housing is connected to said post by a nut which is threadedly engaged with said post and rotatably connected to said housing.

5. The invention in accordance with claim 2 in which said housing comprises means defining a chamber to which said supply tube is connected, said valve assembly comprises a body portion attached to said chamber-defining means, a valve member for closing off said chamber, a spring urging said valve member to chamber-closing position, and said sleeve is adapted to engage said valve member and move it to chamber-opening position under the influence of said biasing means.

6. The invention in accordance with claim 5 in which said bell is formed with an annular lip which surrounds said sleeve and is restrained against relative axial movement by first and second surfaces on said sleeve.

7. The invention in accordance with claim 1 in which said biasing means comprises a coil spring disposed on said post and interconnecting a fixed point on said post and said sleeve.

8. The invention in accordance with claim 7 including a cup portion extending from said sleeve, said sleeve and said cup portion being adapted to enter said housing, a surface of said cup portion being engageable with a valve cam member to open said valve assembly.

9. The invention in accordance with claim 1 including an annular shield removably disposed in said channel and adapted to reduce the open surface area of water therein.

10. The invention in accordance with claim 9 wherein said shield has first and second walls joined together, the first of said walls having a free edge adapted to rest in a bottom portion of said channel and the second of said walls having a free edge adapted to rest against a side surface of said bell member, said shield being adapted to occupy a portion of the width of said channel.

* * * * *